(12) United States Patent
Schimanski et al.

(10) Patent No.: US 7,790,138 B2
(45) Date of Patent: Sep. 7, 2010

(54) PROCESS FOR PRODUCING A THERMOSTABLE TIO2/SIO2 MIXED OXIDE AND MIXED OXIDE PRODUCED THEREFROM

(75) Inventors: Jurgen Schimanski, Brunsbuttel (DE); Kai Dallmann, Brunsbuttel (DE); Sohnke Rolfs, Itzehoe (DE); Kai Dolling, Munsterdorf (DE); Andrea Brasch, Meldorf (DE); Ute Freese, Brunsbuttel (DE)

(73) Assignee: Sasol Germany GmbH, Hamburg (DE)

( * ) Notice: Subject to any disclaimer, the term of this patent is extended or adjusted under 35 U.S.C. 154(b) by 1073 days.

(21) Appl. No.: 11/417,630

(22) Filed: May 4, 2006

(65) Prior Publication Data

US 2007/0003464 A1     Jan. 4, 2007

(51) Int. Cl.
*C01B 33/12* (2006.01)
*C01G 23/047* (2006.01)
*B01J 21/04* (2006.01)
*B01J 23/02* (2006.01)
*C04B 35/00* (2006.01)

(52) U.S. Cl. .................. 423/610; 106/446; 423/338; 423/339; 502/439; 501/134

(58) Field of Classification Search .............. 106/446; 423/610, 338, 339; 502/439; 501/134
See application file for complete search history.

(56) References Cited

U.S. PATENT DOCUMENTS

| 2,253,595 | A | * | 8/1941 | Wood ..................... 423/615 |
| 2,787,586 | A | * | 4/1957 | Catterall ................. 203/18 |
| 4,801,571 | A | * | 1/1989 | Montag et al. .......... 502/236 |
| 4,999,181 | A | | 3/1991 | Klee et al. |
| 5,045,519 | A | | 9/1991 | Meyer et al. |
| 5,128,114 | A | * | 7/1992 | Schwartz ................. 423/335 |
| 5,162,283 | A | * | 11/1992 | Moini .................... 502/236 |
| 6,544,637 | B1 | | 4/2003 | Kosuge |
| 2003/0103889 | A1 | * | 6/2003 | Mirsky et al. ........... 423/326 |

FOREIGN PATENT DOCUMENTS

DE       4322022       12/1995
WO    WO 99/43616      9/1999

OTHER PUBLICATIONS

Jung, Kyeong Youl and Seung Bin Park, Enhanced photoactivity of silica-embedded titania particles prepared by sol-gel process for the decomposition of trichloroethylene, 2000, Applied Catalysis B: Environmental, 25, pp. 249-256.*

(Continued)

*Primary Examiner*—David M Brunsman
*Assistant Examiner*—Kevin M Johnson

(57) ABSTRACT

The present invention relates to a process for preparing $TiO_2$/$SiO_2$ mixed oxides or the hydrates and/or oxide hydrates thereof comprised of 0.5 to 95 wt % $SiO_2$ and the balance as $TiO_2$, each referring to the completely calcined product, by using titanium alcoholates and aqueous silica sol. Moreover, the invention relates to the use of these mixed oxides as catalyst carriers.

17 Claims, 2 Drawing Sheets

OTHER PUBLICATIONS

Zhang, Xin et al., Synthesis of titania-silica mixed oxide mesoporous materials, characterization and photocatalytic properties, 2005, Applied Catalysis A: General, 284, pp. 193-198.*

G. W. Sears, "Analytical Chemestry," vol. 28, No. 12, Dec. 1956, p. 1982-1983.

Zhijie Li, et al. "Comparative study of sol-gel-hydrothermal and sol-gel synthesis of titania-silica composite nanoparticles" Journal of Solid State Chemistry 178 (2005) p. 1395-1405.

Chao Xie, et al. "Enhanced photocatalytic activity of titania-silica mixed oxide prepared via basic hydrolyzation" Materials Science & Engineering B 112 (2004) p. 34-41.

J.E. Swain, et al. "Characterization of titania surface area in titania/silica SCR catalysts by temperature-programmed reaction of 2-propanol" Applied Catalysis A: General 139 (1996) p. 175-187.

* cited by examiner

PROCESS FOR PRODUCING A THERMOSTABLE TIO2/SIO2 MIXED OXIDE AND MIXED OXIDE PRODUCED THEREFROM

CROSS REFERENCE TO RELATED APPLICATION

This application claims priority from German Patent Application No. DE102005021623.4 filed on 4 May, 2005, the disclosure of which is incorporated herein by reference for all purposes.

BACKGROUND OF THE INVENTION

1. Field of the Invention

The present invention relates to a process for preparing a thermostable catalyst carrier based on $TiO_2/SiO_2$ mixed oxides comprised of 0.5 to 95 wt % $SiO_2$ and the balance as $TiO_2$, each referring to the completely calcined product.

2. Description of the Prior Art

Supported catalysts have economically been very important for a long time and make up the largest tonnage among the heterogeneous catalysts. They are used among others for working up fossil raw materials, upgrading intermediates, and making new chemical products. Owing to the worldwide increasing concern for the environment and the legal requirements in connection therewith, these catalysts have also rapidly gained importance for the emission control of exhaust gas.

For example, in industrial countries power stations and automobiles utilising fossil fuels are only approved if they are provided with appropriate supported catalysts for controlling emissions. Said supported catalysts are employed for denitrating (DeNOx) and desulphering flue gases and cleaning the exhaust gases of automobiles.

Conventional catalyst carriers for these applications are porous powders or moulded articles based on $Al_2O_3$, $SiO_2$, MgO, $TiO_2$, and $ZrO_2$. In modern processes, e.g. for cleaning exhaust gases, metallic or ceramic honeycombs coated with oxidic carrier materials are increasingly employed. The catalyst carrier or honeycomb coating has the function among others to enlarge the surface of the active component because the catalyst activity usually increases as the catalyst surface increases.

Naturally, the metal oxides used as carriers, such as $Al_2O_3$, $SiO_2$, MgO, $TiO_2$, and $ZrO_2$ have different properties, e.g. with regard to possible surfaces, pore volumes, acidity, and chemical inertia. Among these metal oxides $TiO_2$ is known for being chemically inert and, consequently, for being especially suitable as a catalytic converter utilised for detoxifying aggressive gases containing e.g. $SO_x$ or $NO_x$ at high temperatures.

Conventional $TiO_2$ materials available on the market have the disadvantage that they have small surfaces and pore volumes so that their use is limited. These commercially available catalyst carriers based on titanium dioxide are mostly produced by precipitation reactions of titanium-containing salts or by flame pyrolysis. When using the latter method with $TiCl_4$, titanium dioxide is obtained, which consists of a crystalline mixed phase (anatase/rutile, approx. 70%/30%) presenting a surface of approx. 58 $m^2/g$ (commercial product e.g. Degussa P 25). When using hydrolysis and calcination with titanium tetra(isopropylate), the resultant titanium dioxide, too, is comprised of a crystalline mixed phase having a surface of 106 $m^2/g$.

Among the three natural varieties of $TiO_2$ (anatase, brookite, rutile) rutile exhibits the highest thermodynamic stability. Rutile is not in demand as a catalyst but is rather employed in large quantities as a white pigment. For catalytic uses anatase is the appropriate variety. Anatase readily converts into rutile at temperatures above 600° C., and thus is of no use for catalysis.

Today pure-phase catalyst carriers based on $TiO_2$ are preferred for heterogeneous catalysis. Said carriers are to have large surfaces and as few disturbing anions (e.g. $SO_4^{2-}$ or $Cl^-$) as possible, i.e. less than 250 ppm.

The alkali content, especially sodium and potassium, and the alkaline-earth content, especially calcium and magnesium, should be less than 50 ppm each, whereas the iron content should be less than 100 ppm so that the effectiveness of the catalytically active phase when subject to heat is not destroyed by the labile chemical lattice defects.

SUMMARY OF THE INVENTION

It is the object of the present invention to provide a simple process for preparing high-purity, thermostable catalyst carriers comprising $TiO_2$ in the anatase phase within the aforesaid limits.

It is particularly intended to avoid intricate pretreatment of the starting materials or elaborate aftertreatment of the $TiO_2/SiO_2$ mixed oxides or suspensions thereof.

It is preferable that the catalyst carrier material has the following features in particular:

a large surface with the catalytically active anatase as the main phase a high pore volume associated with the catalytically active anatase as the main phase a high thermostability of the carrier in order to prevent transformation of the catalytically active anatase to rutile so that the durability/stability of the carrier is increased as few chemical impurities as possible.

The problem described hereinbefore can be solved by a process according to the independent claims stated hereinbelow. The preferred embodiments of the subject invention are set out in the subordinate claims or below.

DESCRIPTION OF THE PREFERRED EMBODIMENTS

Figure 1:
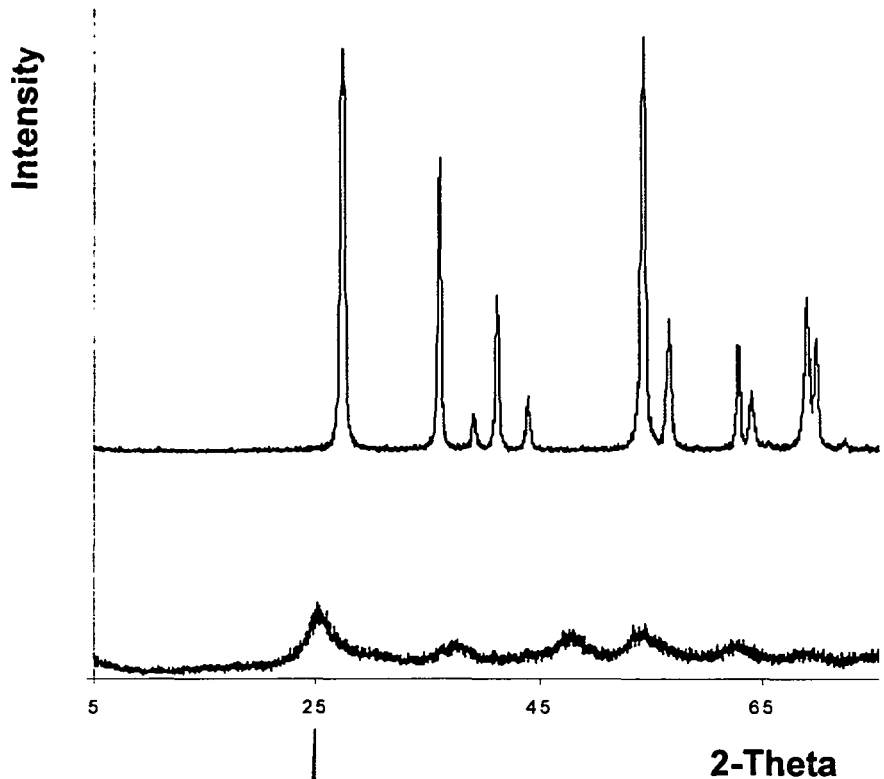
FIG. 1 shows the x-ray diffraction pattern (XRD) of $TiO_2$ prepared by hydrolysis of titanium tetra(isopropylate) in the presence of oxalic acid.

It has surprisingly been discovered that when using titanium alcoholate as titanium component and silicic acid purified on cation-exchange resins yielding silica sol as $SiO_2$ source, useful catalyst carriers are obtained. In this process the titanium alcoholate is hydrolysed, preferably with deionised water, and the silica sol purified on cation-exchange resins is added simultaneously, partially simultaneously, or subsequently.

The process of the invention comprises the reaction of a titanium compound having at least one $C_1$- to $C_{16}$-alcoholate group in an aqueous medium with a silicic acid compound, followed by drying or calcination of the resultant product. It is preferable to use deionised water for the hydrolysis and to add the silicic acid purified on cation-exchange resins simultaneously or subsequently.

The resultant $TiO_2/SiO_2$ mixed oxide is comprised of 0.5 to 95 wt % $SiO_2$ and the balance as $TiO_2$, each referring to the completely calcined product. It has been found that with less than 60 wt % $SiO_2$ the mixed oxides do not comprise the rutile phase but comprise the catalytically active anatase variety, whereas with a $SiO_2$ content of greater 90 wt % the mixed oxides are usually amorphous according to x-ray analysis.

Preferably, the reaction product then is calcined at >550° C. for at least 30 minutes (mean time). The products were calcined at 550° C. to 1,100° C. during 30 minutes to 24 hours.

Owing to the isomorphous incorporation of the silicic acid nanoparticles (average size 1.8 to 9.3 nm by Sears titration) when using the process of the invention, catalyst carriers with a homogenous distribution of $TiO_2$ and $SiO_2$ are obtained. The specific surface of the carriers is in the range from 100 to greater 725 $m^2/g$, depending on the $SiO_2$ content, and their surface stability is excellent. Surprisingly, the main phase of the mixed oxides exposed to calcination (3 h/550° C.) ranges from anatase to amorphous (with 90% $SiO_2$) as the $SiO_2$ content increases. No rutile has been found.

After calcination at 1,100° C. for 24 hours (stability test), depending on the $SiO_2$ content, the carriers prepared according to the process of the invention have a surface stability of up to 240 $m^2/g$ (e.g. with 60% $SiO_2$) so that the expected durability and service life make them very useful as catalyst carriers for example in combustion processes or exhaust-gas cleaning processes.

Furthermore, the chemical purity of the catalyst carriers described herein is advantageous on account of their low content of iron (especially if less than 25 ppm), sodium (especially if less than 25 ppm), potassium (especially if less than 50 ppm), calcium (especially if less than 25 ppm), magnesium (especially if less than 25 ppm), zinc (especially if less than 25 ppm), nickel (especially if less than 10 ppm), and of sulfate and chloride, especially if each is less than 200 ppm, and even with carriers containing as much as 95 wt % $SiO_2$. After calcination, i.e. exposure to a temperature of above 550° C., these carriers have a total purity of >99.9 wt %, based on the $TiO_2/SiO_2$ ratio to the total oxidic mass. These catalyst carriers are defined as high-purity carriers within the meaning of this invention.

According to the process of the invention, titanium alcoholates having at least one alcoholate group, which can be a blend of alcoholates or just one alcoholate, are used. These alcoholates can be produced for example from titanium compounds and alcohols or by transesterification of commercially available titanium tetra(isopropylate).

The titanium alcoholates are either hydrolysed with deionised water while simultaneously adding thereto silicic acid purified on cation-exchange resin, preferably in quantities from 0.1 to 8.0 wt %, or the $TiO_2$/water mixture obtained after the hydrolysis with deionised water is mixed with silica solution purified on cation-exchange resin in quantities from 0.1 to 8.0 wt %. After the hydrolysis a hydrothermal aging procedure may be carried out in one or several steps for at least 1 hour at temperatures from 90 to 235° C., wherein each step may be performed at a different temperature.

A special advantage of the process of the invention over conventional $TiO_2$-based materials obtained by precipitation reaction or flame pyrolysis is the optimal chemostructural incorporation of the isomorphous $SiO_4$ building blocks into the $TiO_2$/water phase by means of silicic acids obtained by cation exchange. It is favourable to use a stirred reactor, e.g. as defined in DE-3823895, while taking into consideration that the stirrer speed influences crystal and pore size. A static mixer may be used as well. The hydrothermal aging is carried out at temperatures from 70 to 235° C., especially 90° to 210° C. It is performed prior to drying or calcination, preferably under pressure for example in an autoclave.

An analysis of the chemical impurities of the products of the invention has shown that the following threshold values are not exceeded:

| | | |
|---|---|---|
| Iron (<25 ppm) | Sodium (<25 ppm) | Potassium (<50 ppm) |
| Calcium (<25 ppm) | Magnesium (<25 ppm) | Zinc (<25 ppm) |
| Nickel (<10 ppm) | Chloride (<200 ppm) | Sulfate (<200 ppm) |

These compounds are defined as high-purity within the meaning of this invention.

The same applies to pure titanium dioxide (cf. Examples 1 and 2). The anions, which are inherent when using mineral acids and organic acids in the hydrolysis, have not been determined because they decompose after calcination of the carrier substances, e.g. at 550° C. for 3 hours. Most anions do not produce lattice defects in the titanium dioxide products or mixed oxides of the invention. Not so the anions chloride and sulfate.

Titanium Dioxides from Titanium Alcoholates, Effects of Aging and Aging Additives Examples 1 and 2 show the behaviour of pure titanium dioxide obtained by hydrolysis of different titanium alcoholates in the presence of various chemical hydrolysis additives. The physical data of these titanium dioxides have been compared with the mixed oxides of the invention.

Titanium dioxides which have not been exposed to hydrothermal aging have comparatively small pore volumes and surfaces, e.g. a pore volume of 0.11 ml/g and a surface of 54 $m^2/g$ in the case of titanium tetra(2-ethylhexanolate) (see Table 1). However, when subjecting titanium dioxide suspensions, which have been freed from the reaction alcohol, to hydrothermal aging, the pore volume is significantly higher (0.34 ml/g) and the surface is larger (80 $m^2/g$) (see Table 2). Irrespective of the titanium alcoholate used, these improvements of the physical properties are brought about at a neutral pH value (e.g. with water), at an acidic one (e.g. in the presence of leucine or $HNO_3$), and at a basic pH value (e.g. in the presence of $NH_3$ or $NH_4HCO_3$) (cf. Example 2). However, the hydrothermal aging step has not brought about pore volumes of greater 0.38 ml/g in any of the all-$TiO_2$ products comprising anatase in the main phase (see Example 2).

In crystallographic aspects it is interesting to note that the crystalline main phase of the pure titanium dioxides of Examples 1 and 2 is mostly anatase, occasionally with small amounts of Brookite, but with the following exceptions:

1. When the hydrolysis medium contained oxalic acid, amorphous anatase was obtained without aging. The anatase then transformed to rutile by subsequent hydrothermal aging (see FIG. 1).
2. When the hydrolysis medium contained ammonium bicarbonate, amorphous $TiO_2$ was obtained without aging. The $TiO_2$ then was transformed to the all-anatase phase by subsequent calcination at 550° C. (see FIG. 2).

Influence of the SiO$_2$ Content in a Mixed Oxide Prepared with Hydrolysis of Titanium Alcoholates; Comparison Between Co-Hydrolysis and Slurry Doping According to the process of the invention including co-hydrolysis, wherein the titanium alcoholate is hydrolysed in the presence of silicic acid, the TiO$_2$/SiO$_2$ ratio in the catalyst carrier is adjusted by reducing or increasing the silicic acid quantity and adjusting the alcoholate feed without changing the total quantity of reactants.

It has been found that in contrast to TiO$_2$ prepared by hydrolysis of titanium alcoholates, larger surfaces and higher pore volumes are obtained, irrespective of the titanium alcoholate used, when increasing the SiO$_2$ quantity (see Example 3).

It is particularly remarkable that even very small quantities of SiO$_2$ added in the form of the silicic acid mentioned hereinabove (>1.4% solids), larger surfaces (>140 m$^2$/g) are obtained (cf. All TiO$_2$ having a maximum surface of 83 m$^2$/g) (see Example 1, Table 1, Example 3, and Table 4).

Looking at the surface values as a function of the hydrolysis temperature (25° C. and 70° C.) and an increasing SiO$_2$ content, it becomes apparent that the values found at 25° C. and with a SiO$_2$ content of approx. 30% reach a maximum of about 220 m$^2$/g and then decline. At 70° C. the surface increases much more and reaches about 250 m$^2$/g with a SiO$_2$ content of only approx. 20%. Surprisingly, the surface continues to increase as the SiO$_2$ content increases and reaches about 550 m$^2$/g with a SiO$_2$ content of approx. 90%.

In a binary mixed-oxide system comprising TiO$_2$ and SiO$_2$ these values are expected to increase only linearly. The increase is supposed not to exceed the values of the starting components in proportion to their quantities, e.g. 100% TiO$_2$ (surface: 83 m$^2$/g; pore volume: 0.22 ml/g) and 100% SiO$_2$ prepared from silicic acid (surface: 345 m$^2$/g; pore volume: 0.08 ml/g).

Consequently, the surprising result is the overproportionate increase in surface, which reaches a maximum of about 550 m$^2$/g in the case of titanium tetra(isopropylate) and a hydrolysis temperature of 70° C. (cf. Table 4) at a TiO$_2$/SiO$_2$ mixed-oxide ratio of approx. 10:90 (wt %:wt %). This result exceeds the calculated value by 37% (at a TiO$_2$/SiO$_2$ mixed-oxide ratio of 10:90=(83 (m$^2$/g):10)·1+(345 (m$^2$/g):10)·9=319(m$^2$/g)).

Another surprise is the overproportionate increase in pore volume, which reaches a maximum of 0.46 ml/g in the case of titanium tetra(isopropylate) and a hydrolysis temperature of 70° C. (cf. Table 4) at a TiO$_2$/SiO$_2$ mixed-oxide ratio of approx. 90:10. This result exceeds the calculated value by 120% (at a TiO$_2$:SiO$_2$ mixed-oxide ratio of 90:10=(0.22 (ml/g):10)·9+(0.08 (ml/g):10)·1=0.21 (ml/g)).

The co-hydrolysis of silicic acid and titanium alcoholates and the slurry-doping method (at first hydrolysis of the titanium alcoholates, followed by addition of silicic acid) have revealed that surface and pore volume increase overproportionately as the SiO$_2$ content increases. Comparing co-hydrolysis (Example 3) and slurry doping (Example 4), similar results are obtained at a low SiO$_2$ content (less than 20 wt %). From a SiO$_2$ content of 20% it has surprisingly been found that the unexpectedly high surface and pore volume values reached by co-hydrolysis are even topped by slurry doping. For example, with a SiO$_2$ content of approx. 10% a pore volume maximum of 0.46 ml/g is reached by co-hydrolysis, whereas at a SiO$_2$ content of approx. 20% the pore volume increases to 0.67 ml/g by slurry doping. It has thus been demonstrated that the unexpected physical properties of the catalyst carriers of the invention are displayed both with co-hydrolysis and slurry doping.

The physical data of the mixed oxides show that surface and pore volume increase as the SiO$_2$ content increases. Surprisingly, this behaviour is in the main independent of the titanium alcoholate used. It has thus been proved that both water-miscible alcohols and water-immiscible ones are suitable substitutes for the titanium alcoholates used for hydrolysis.

In addition to the process selected from the two different processes for preparing TiO$_2$/SiO$_2$ mixed-oxide catalysts, the SiO$_2$ quantity, the hydrolysis temperature, and the temperature and duration of hydrothermal aging exert influence on surface and pore volume.

Crystal Structures

It can be proved by x-ray diffraction that, regardless whether co-hydrolysis or slurry doping is the method of choice, similar crystal structures are formed in the catalyst carriers at comparable TiO$_2$:SiO$_2$ ratios. In crystallographic aspects it is interesting that the crystalline main phase of the TiO$_2$/SiO$_2$ mixed-oxides is mostly anatase, optionally with small amounts of brookite (cf. Examples 4 to 6). However, it is surprising that for example by addition of 2 wt % ammonium bicarbonate to the hydrolysis water and with a TiO$_2$:SiO$_2$ ratio of about 90:10 a TiO$_2$/SiO$_2$-mixed oxide comprising the TiO$_2$ as all anatase is obtained after hydrothermal aging at 210° C. for 5 hours (cf. Table 8, FIG. 3).

The crystallite size of unaged mixed oxides normally ranges from 5 to 12 nm (determined on the 101 reflex) and from 5 to 11 nm (measured on the 200 reflex).

Influence of Aging After Co-Hydrolysis or Slurry Doping

When comparing the products prepared by co-hydrolysis or slurry doping after hydrothermal aging, it has been found that the surfaces obtained by co-hydrolysis tend to be slightly larger than by slurry doping, the SiO$_2$ content being the same (see Table 8). On the contrary, slightly higher pore volumes are obtained by the slurry doping process variant. So, the two processes are complementary.

Influence of the Hydrothermal Aging Temperature

The influence of the hydrothermal aging temperature on the physical properties of the novel mixed oxides is seen when taking a close look at the surfaces of mixed oxides containing for example approx. 20% SiO$_2$ after aging at 90° C. versus 210° C. It has been found that the surface decreases as the temperature increases (see Table 8). In the case of co-hydrolysis the surface decreased from 294 to 205 m$^2$/g, whereas in the case of slurry doping the value dropped from 282 to 156 m$^2$/g. The pore volumes, however, increased unexpectedly at high hydrothermal aging temperatures (e.g. 210° C.). For example, the pore volume of the mixed oxides containing approx. 20% SiO$_2$, which were prepared by the co-hydrolysis method, increased from 0.44 ml/g after hydrothermal aging at 90° C. to 1.14 ml/g after hydrothermal aging at 210° C. The same has been observed with the slurry doping process, although to a lesser extent, namely from 0.67 to 0.93 ml/g with a SiO$_2$ content of approx. 20%. So, these surprising results have been found with either process variant.

In summary it has been discovered that by raising the hydrothermal aging temperature after co-hydrolysis to >90° C., particularly >150° C., the pore volumes increase considerably so that TiO$_2$/SiO$_2$ mixed oxides having pore volumes of >1.0 ml/g can be prepared. To top it all, these products are comprised of >95 wt % anatase.

Influence of the Stirrer Speed on Hydrothermal Aging

When examining the influence of the mechanical energy input at constant aging conditions on the product properties, which is described by the stirrer circumferential velocity, it has been found that the surface remains unchanged with an increasing stirrer circumferential velocity, whereas the pore volume increases steadily (cf. Table 9).

Influence of the SiO$_2$ Source (Hydrolysed Siloxanes vs. Silicic Acid)

Silicic acid is released in an aqueous-ethanolic phase by acid-catalysed hydrolysis of silicic acid esters, such as tetraethoxysilane (TEOS), with addition of water. In the presence of titanium alcoholates a SiO$_2$/TiO$_2$ mixed oxide is formed because the two hydrolysis steps are carried out simultaneously.

The physical data of the mixed oxides reveal the same relations as already described hereinabove in connection with the products prepared by co-hydrolysis. Pore volume and surface increase as the SiO$_2$ content increases. However, when comparing the absolute values of mixed oxides prepared by hydrolysis of TEOS with products prepared according to the process of the invention, it has become apparent that their surface or pore volume or both are lower.

For example, a mixed oxide prepared by hydrolysis of TEOS and containing approx. 10 wt % SiO$_2$ was found to have a pore volume of 0.41 ml/g and a surface of 213 m$^2$/g, whereas silicic acid prepared by means of ion-exchange resin (see Table 4) resulted in a pore volume of 0.46 ml/g and a surface of 232 m$^2$/g.

The difference between these two SiO$_2$ sources is even more pronounced, when comparing the results of hydrothermal aging at 210° C. after hydrolysis of TEOS (see Example 8) versus the process of the invention (see Example 6). A pore volume of 0.61 ml/g and a surface of 168 m$^2$/g were obtained with approx. 10 wt % SiO$_2$ in the mixed oxide (cf. Table 11), whereas according to Table 8, pore volume and surface were found to be 0.94 ml/g and 182 m$^2$/g, respectively.

The indispensable addition of acid needed to release silicic acid e.g. from TEOS has probably an unfavourable effect.

Influence of the Silicic Acid Age

Silicic acids are also commercially available, e.g. LEVASIL 500 (pH 9.3; sodium content: 420 ppm). The threshold values for impurities are within the specified limits.

When using LEVASIL 500 for the hydrolysis of the titanium alcoholates, pore volume and surface of unaged and aged products are comparable. However, similar observations as in Example 8 were made and the advantages of the present invention have not become evident in the hydrolysis of titanium alcoholates with LEVASIL 500 either.

Thermostability

Catalyst carriers in use are frequently exposed to high temperatures. The maximum temperature a catalyst carrier can withstand without damage differs with its application.

For catalytic converters a process of measuring the thermostability has become generally accepted. The capability of the carrier surface to resist changes is assessed by long-time exposure (e.g. 3 or 24 hours) to a temperature which is typical of the particular application. Normally, the carrier surface of modern feedback catalytic converters used e.g. in Otto engines is supposed to preserve a surface of at least 50 m$^2$/g after 24 hours at 1,100° C. On the contrary, catalyst carriers for Diesel engines need to resist considerably lower temperatures (e.g. 3 hours at 800° C.).

It has been found (cf. Table 13) that the thermostability is already remarkable from a SiO$_2$ content of 5 wt % so that the requirements are fulfilled by catalyst carriers designed for use at lower operating temperatures. The thermostability increases as the SiO$_2$ content increases so that with a SiO$_2$ content of >20 wt % the catalyst carriers are suitable both for low and high operating temperatures.

When comparing the surface of the TiO$_2$/SiO$_2$ mixed-oxide catalyst carrier with the requirements made on catalytic converters, the economic and technical potentialities of the novel carrier material are sensational.

Phase Change

The data compiled in Tab. 14 show that the measures described hereinbelow or a combination thereof obviously have a favourable effect on the phase change from anatase to rutile allowing higher temperatures:

1. quantity of SiO$_2$ added to the mixed oxide
2. temperature and duration of aging of the mixed oxide
3. addition of chemicals at least during hydrolysis of the titanium alcoholates The temperature at which rutile is formed (T$_{rutile}$) from pure TiO$_2$ (100/0) (hydrolysis of titanium tetra(isopropylate) at 70° C. in water) is 680° C. (see Tab. 14). When the hydrolysis is carried out with a higher quantity of fresh silicic acid obtained by cation exchange (co-hydrolysis), the rutile formation temperature T$_{rutile}$ of mixed oxides containing 11% SiO$_2$ shifts to 1,080° C. This phase-change temperature increase of 400° C. is exceptionally high. By addition of the SiO$_2$ quantity e.g. to 53.8% the rutile formation temperature was found to increase further by 80° C. to 1,160° C.

On closer examination of TiO$_2$/SiO$_2$ mixed oxides having a mixing ratio of approx. 90:10 it becomes apparent (cf. Tab. 14) that a rutile phase change at higher temperatures can also be brought about by hydrothermal aging of the TiO$_2$/SiO$_2$ mixed oxides e.g. at 90° C. or 210° C., whereby the phase-change temperature is raised by at least 380° C.

The increase in the rutile phase-change temperature can be influenced by the chemicals added during hydrolysis of the titanium alcoholates (cf. Tab. 14). The temperature increases by 490° C. when the TiO$_2$/SiO$_2$ mixed oxide is prepared by addition of silica sol to TiO$_2$ slurry containing NH$_4$HCO$_3$ and subsequent aging at 210° C. for 4 hours (T$_{rutile}$=1,250° C.).

The present invention will be illustrated by reference to the following figures:

FIG. 1 shows the x-ray diffraction pattern (XRD) of TiO$_2$ prepared by hydrolysis of titanium tetra(isopropylate) in the presence of oxalic acid, the unaged sample (cf. Example 1) is depicted below in the figure, whereas the hydrothermally aged sample (210° C./5 h) is depicted above (cf. Example 2).

Figure 2:
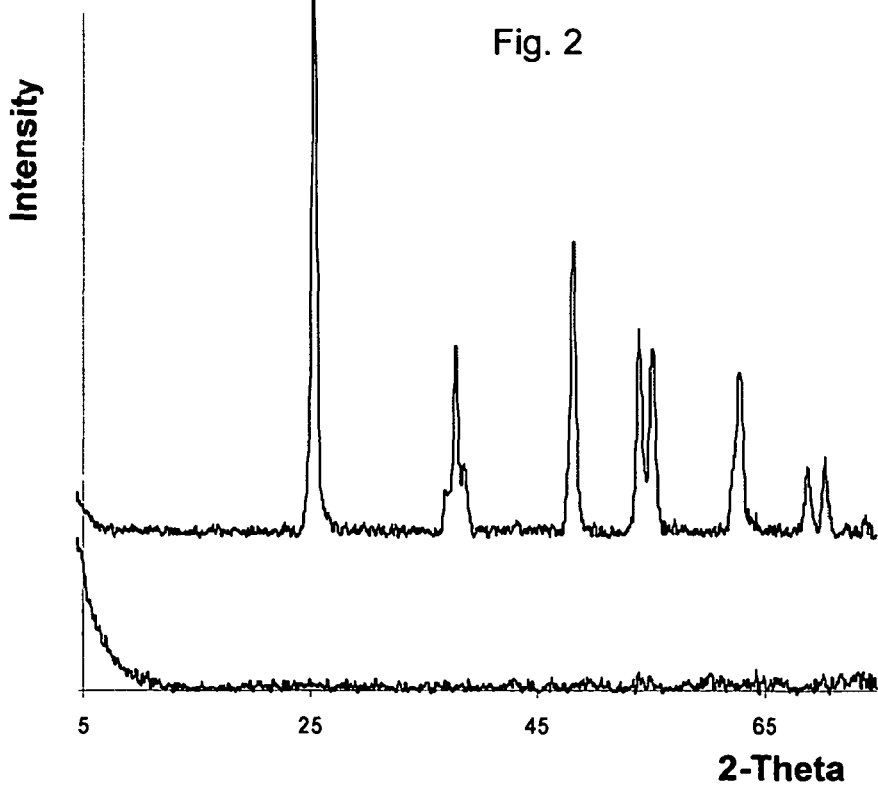
FIG. 2 shows the x-ray diffraction pattern of $TiO_2$ prepared by hydrolysis of titanium tetra(hexanolate) in the presence of ammonium bicarbonate.

FIG. 2 shows the x-ray diffraction pattern of TiO$_2$ prepared by hydrolysis of titanium tetra(hexanolate) in the presence of ammonium bicarbonate. The uncalcined sample (cf. Example 1) is depicted below in the figure, whereas the sample calcined at 550° C. is depicted above.

Figure 3:
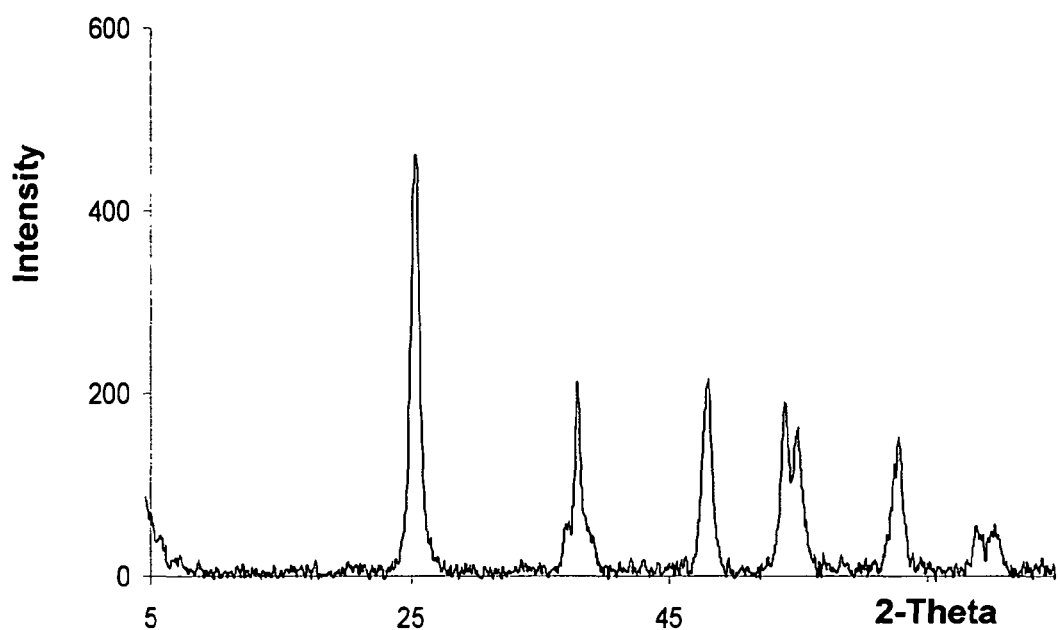
FIG. 3 shows the x-ray diffraction pattern of $TiO_2/SiO_2$ (90 wt %:10 wt %) prepared by hydrolysis in the presence of 2 wt % ammonium bicarbonate after hydrothermal aging.

FIG. 3 shows the x-ray diffraction pattern of TiO$_2$/SiO$_2$ (90 wt %:10 wt %) prepared by hydrolysis in the presence of 2 wt % ammonium bicarbonate after hydrothermal aging (210° C./5 h) (cf. Table 8).

Figure 4:
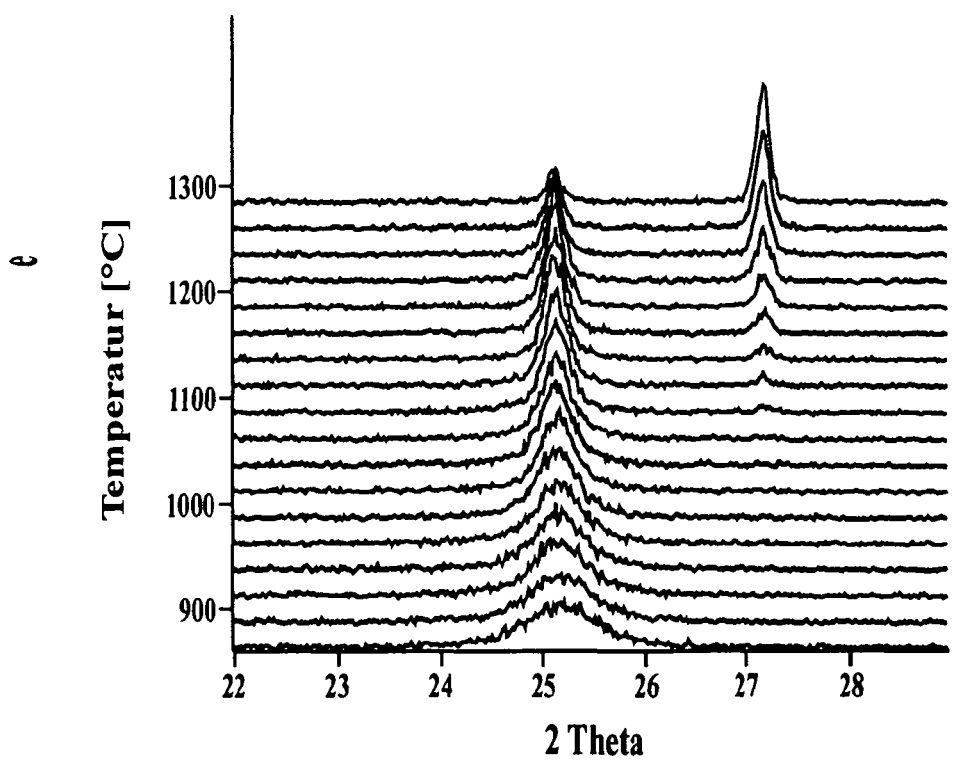
FIG. 4 shows the x-ray diffraction pattern of $TiO_2/SiO_2$ (89 wt %:11 wt %) at different temperatures.

FIG. 4 shows the x-ray diffraction pattern of TiO$_2$/SiO$_2$ (89 wt %:11 wt %) at different temperatures (for the mixed-oxide preparation, cf. Table 14: Co-hydrolysis of TiIP with silicic acid at 70° C.; aging: 90° C./5 h).

Experiments

Analyses

The trace elements content in the compounds of the invention was determined by inductively coupled plasma atomic emission spectroscopy (AES-ICP) (spectrometer manufacturer: SPECTRO).

The surface of the pure oxides or TiO$_2$/SiO$_2$ mixed oxides was measured by N$_2$-sorption according to BET (see DIN 66131, apparatus: Autosorb 6 of Micromeretics company).

The pore volume was determined by nitrogen porosimetry (see DIN 66134, apparatus: Autosorb 6 of Micromeretics company) and/or mercury penetration (intrusion volume) (see DIN 66133, porosimeter: Autopore IV of Micromeretics company, contact angle: 131°).

The compounds of the invention were calcined in a muffle furnace at temperatures from 550° C. to 1,100° C. Deionised water was used for hydrolysis.

The x-ray diffraction pattern were measured by means of an apparatus (D 5000) from Siemens (angle range: 2 theta=2 to 75° in increments of 0.035°; measurement time: 1 s/°) using Cu as anode material at a wave length of 1.54051 Å.

The crystallite size was determined on the 101- and 200-reflexes of the anatase phase by means of the Scherrer formula:

crystallite size=(K·lambda·57.3)/(beta·cos theta)

where:
K (form factor): 0.992
lambda (x-ray wave length): 0.154 nm
beta (corrected apparatus line broadening): dependent on the reflex
theta: dependent on the reflex The silicic acid particle size of the silica sol was determined by Sears titration (G. W. Sears, Anal. Chemistry 12, 1956, pp. 1982-83).

The viscosities were measured by means of a Brookfield viscometer (DV-II, measuring element 1).

The temperature of the phase-change from anatase to rutile was measured by x-ray diffraction (XRD) using a high-temperature diffractometer (HDK S1 from Bühler) in the atmosphere of air. The measurements were carried out at temperatures from 500 to 1,250° C., depending on the sample. The heating rate was 10° C./min up to the first measurement point. The diffraction then was recorded at stagnant temperature in a 2-theta range from 21 to 29° in increments of 0.02° with a measurement time of 2 seconds per increment. Then the temperature was raised by 20° C. in increments of 10° C./min. The diffraction was recorded by means of a theta/theta diffractometer (manufacturer: Seifert company, Ahrensburg) in a diffraction geometry of parallelised Cu—Kα radiation. The resolution was found to be approx. 0.08° in 2 theta, measured on the standard $Al_2O_3$.

The excitation conditions were 40 kV and 35 mA. The detector was a scintillation counter. Prior to the measurements, the temperature was calibrated by recording the phase transformation of $Ag_2SO_4$ at 427° C. and of molten KCl and $K_2SO_4$ at 776° C. and 1,069° C. resp. Heating rate and measurement were controlled using the Rayflex software (x-ray diffraction software from Seifert).

By the term 'rutile phase-change temperature' as used herein is meant the temperature at which an intensity supposed to be rutile is measurable for the first time by x-ray diffraction (start of rutile formation). An example is illustrated in FIG. 4 showing a rutile formation temperature of 1,080° C.

Chemicals

Titanium Component (Titanium Alcoholates)

The titanium component used herein was commercially available high-purity titanium tetra(isopropylate) (TiIP) (e.g. from Synetix, Billingham (UK) or Nippon Soda, Tokio (Japan)). The TiIP had a melting point from 16.7 to 17.9° C. The titanium content was in the range from 16.5 to 17.0 wt %. The chemical purity with respect to the content of iron and chloride was 1 to 2 ppm and 6 to 18 ppm, resp. The other titanium alcoholates referred to herein were obtained by reaction of TiIP with the corresponding alcohols (see below).

Silicon Component (Silica Sols)

The silica sols were prepared by exchanging the sodium ions of a silicate solution for protons by means of acidic ion-exchange resins (cation-exchange resins). To this end commercially available sodium silicate solution (e.g. containing 28 wt % $SiO_2$; from PQ Germany GmbH) was diluted with deionised water so that the $SiO_2$ content was approx. 3 to 4 wt %. The solution then passed a column packed with ion-exchange resins, which had been packed before with a regenerated commercial cation-exchange resin (e.g. Lewatit S 100 marketed by Bayer or SYBRON Chemicals Inc., Pittsburgh, USA) and, prior to the exchange procedure, had been rinsed with deionised water until the conductivity of the eluate was less than 5 microS/cm. The cation exchange takes place according to the following reaction equation:

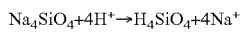

$Na_4SiO_4+4H^+ \rightarrow H_4SiO_4+4Na^+$

The eluate contains fresh silica sol having a pH of approx. 3.5. This sol contains approx. 3 to 4% $SiO_2$, depending on the batch, and has a low sodium content of less than 10 ppm. It was used in the experiments described hereinbelow. The exhausted cation-exchange resin was regenerated according to the manufacturer's instructions, i.e. by repeated washing with a 10% hydrochloric acid solution.

Fresh silica sol was prepared by using a commercially available cation-exchange resin. As used herein, the term 'fresh' means that the silica sol has a low degree of oligomerisation, which can be estimated on the basis of the particle size (in nm) determined by the Sears titration described hereinabove. The fresh silica sol prepared by cation exchange (pH 3.6) had a particle size of 1.8 nm according to Sears titration and the viscosity was less than 10 mPas. The oligomerisation degree increases with time (measurable by Sears particle size). For example, 4 hours after preparation the silica sol particle size was found to be 2.4 nm, whereas after 24 hours a particle size of 2.8 nm was measured and the viscosity still was less than 10 mPas.

It has been discovered that the silicic acid nanoparticles prepared in this way are particularly suitable for the reaction described herein because of their surprisingly high reactivity among other things.

Example 1

Titanium Dioxide

Comparative Experiment with and without Hydrothermal Aging

In a stirred reactor suspensions were prepared from pure $TiO_2$ by hydrolysis of titanium alcoholates having a titanium content from 16.8 to 4.5 wt % (see Table 1). As for titanium tetra(isopropylate) (TiIP, 16.8 wt % Ti) for example, the hydrolysis was carried out continuously with 45 kg of TiIP and 135 kg of deionised water at temperatures ranging from 30 to 90° C. and during 30 to 60 minutes. The hydrolysis proceeded in a basic medium as well as in a neutral and an acidic one. For the acidic part of the hydrolysis aqueous solutions of various mineral acids or organic acids were employed.

The resultant suspension then was subjected to azeotropic steam distillation in order to remove the alcohol released during hydrolysis and, thereafter, it was dried in a spray drier at an air-outlet temperature from 100 to 130° C. The carbon content in the resultant solids was less than 0.2 wt %, and the solids content in the products thus prepared was in the range from 75 to 85 wt % (determined by DTG, end point 1,000° C.).

The titanium alcoholates used herein included titanium tetra(isopropylate) (TiIP with 16.8 wt % Ti), titanium tetra(2-ethylhexanolate) (TiEtHex with 8.5 wt % Ti), titanium tetra(butanolate) (TiBut with 8.5 wt % Ti), titanium tetra(2-ethylbutanolate) (TiEtBut with 8.5 wt % Ti), titanium tetra(hexanolate) (TiHex with 9.5 wt % Ti), and titanium tetra(2-butyloctanolate) (TiButOct with 4.5 wt % titanium). The alcoholate/water mass ratio was overstoichiometric (water excess). The physical data of the resultant $TiO_2$ have been compiled in Table 1.

TABLE 1

PHYSICAL DATA OF THE TiO$_2$ CATALYST CARRIERS OF EXAMPLE 1
(WITHOUT HYDROTHERMAL AGING)

| Alcoholate | Hydrolysis Medium | Hydrolysis Temp. [° C.] | Surface [m$^2$/g]$^{1)}$ | Pore Volume [ml/g]$^{2)}$ | Crystal Structure$^{3)}$ |
|---|---|---|---|---|---|
| TiIP | Water | 30 | 60 | 0.16 | Anatase/Brookite |
| TiIP | Water | 70 | 60 | 0.15 | Anatase/Brookite |
| TiIP | NH$_3$ (0.2%) | 70 | 59 | 0.23 | Anatase/Brookite |
| TiIP | HNO$_3$ (0.2%) | 70 | 52 | 0.14 | Anatase/Brookite |
| TiIP | HCOOH (0.65%) | 70 | 59 | 0.14 | Anatase/Brookite |
| TiIP | CH$_3$COOH (0.2%) | 70 | 58 | 0.22 | Anatase/Brookite |
| TiIP | Oxalic acid (1.25%) | 70 | 22 | 0.08 | Amorphous (Anatase) |
| TiIP | Leucine (1.0%) | 70 | 85 | 0.14 | Anatase/Brookite |
| TiEtHex | NH$_3$ (0.2%) | 90 | 54 | 0.11 | Amorphous (Anatase/Brookite) |
| TiEtHex | HNO$_3$ (0.2%) | 90 | 46 | 0.10 | Anatase/Brookite |
| TiBut | NH$_3$ (0.2%) | 70 | 33 | 0.26 | Anatase/Brookite |
| TiBut | HNO$_3$ (0.2%) | 70 | 52 | 0.12 | Anatase/Brookite |
| TiEtBut | NH$_3$ (0.2%) | 70 | 38 | 0.07 | Amorphous (Anatase/Brookite) |
| TiEtBut | HNO$_3$ (0.2%) | 70 | 54 | 0.10 | Anatase/Brookite |
| TiHex | NH$_4$HCO$_3$ (2%) | 30 | 33 | 0.14 | Amorphous |
| TiHex | NH$_3$ (0.2%) | 70 | 23 | 0.19 | Amorphous (Anatase/Brookite) |
| TiHex | HNO$_3$ (0.2%) | 70 | 49 | 0.08 | Anatase/Brookite |
| TiButOct | NH$_3$ (0.2%) | 70 | 79 | 0.26 | Anatase/Brookite |
| TiButOct | HNO$_3$ (0.2%) | 70 | 47 | 0.09 | Anatase/Brookite |

Legend:
TiIP titanium tetra(isopropylate)
TiEtHex titanium tetra(2-ethylhexanolate)
TiBut titanium tetra(butanolate)
TiEtBut titanium tetra(2-ethylbutanolate)
TiHex titanium tetra(hexanolate)
TiButOct titanium tetra(2-butyloctanolate)
$^{1)}$multipoint BET (N$_2$) [m$^2$/g] (calcination 3 h/550° C.)
$^{2)}$intrusion pore volume (Hg) [ml/g] for pore radii from 0-80 nm (calcination 3 h/550° C.)
$^{3)}$x-ray diffraction analysis of the main/side phases of uncalcined products (for low-crystalline amorphous products the crystal phase is put in brackets)

Example 2

Titanium Dioxide

Comparative Experiment with Hydrothermal Aging

The experiment was carried out as described in Example 1, the difference being that the TiO$_2$ suspensions obtained after the synthesis were subjected to aging at different temperatures and during varying periods of time before they were spray-dried. The physical data of the resultant TiO$_2$ have been compiled in Table 2.

TABLE 2

PHYSICAL DATA OF THE TiO$_2$ CATALYST CARRIERS OF EXAMPLE 2
(WITHOUT HYDROTHERMAL AGING (5 h/210° C.))

| Alcoholate | Hydrolysis Medium | Hydrolysis Temperature [° C.] | Surface [m$^2$/g]$^{1)}$ | Pore Volume [ml/g]$^{2)}$ | Crystal Structure$^{3)}$ |
|---|---|---|---|---|---|
| TiIP | Water | 30 | 88 | 0.30 | Anatase/Brookite |
| TiIP | Water | 70 | 78 | 0.38 | Anatase/Brookite |
| TiIP | NH$_3$ (0.2%) | 70 | 85 | 0.30 | Anatase/Brookite |
| TiIP | HNO$_3$ (0.2%) | 70 | 72 | 0.22 | Anatase/Brookite |
| TiIP | HCOOH (2.5%) | 70 | 70 | 0.24 | Anatase/Brookite |
| TiIP | CH$_3$COOH (3.3%) | 70 | 75 | 0.23 | Anatase/Brookite |
| TiIP | Oxalic acid (1.4%) | 70 | 43 | 0.44 | Rutile |
| TiIP | Leucine (1.0%) | 70 | 87 | 0.24 | Anatase/Brookite |
| TiEtHex | NH$_3$ (0.2%) | 90 | 80 | 0.34 | Anatase/Brookite |
| TiEtHex | HNO$_3$ (0.2%) | 90 | 67 | 0.22 | Anatase/Brookite |
| TiBut | NH$_3$ (0.2%) | 70 | 81 | 0.29 | Anatase/Brookite |

TABLE 2-continued

PHYSICAL DATA OF THE $TiO_2$ CATALYST CARRIERS OF EXAMPLE 2
(WITHOUT HYDROTHERMAL AGING (5 h/210° C.))

| Alcoholate | Hydrolysis Medium | Hydrolysis Temperature [° C.] | Surface $[m^2/g]^{1)}$ | Pore Volume $[ml/g]^{2)}$ | Crystal Structure[3] |
|---|---|---|---|---|---|
| TiBut | $HNO_3$ (0.2%) | 70 | 89 | 0.26 | Anatase/Brookite |
| TiEtBut | $NH_3$ (0.2%) | 70 | 71 | 0.23 | Anatase/Brookite |
| TiEtBut | $HNO_3$ (0.2%) | 70 | 82 | 0.31 | Anatase/Brookite |
| TiHex | $NH_4HCO_3$ (2%) | 30 | 33 | 0.14 | Amorphous |
| TiHex | $NH_3$ (0.2%) | 70 | 72 | 0.25 | Anatase/Brookite |
| TiHex | $HNO_3$ (0.2%) | 70 | 62 | 0.19 | Anatase/Brookite |
| TiButOct | $NH_3$ (0.2%) | 70 | 87 | 0.22 | Anatase/Brookite |
| TiButOct | $HNO_3$ (0.2%) | 70 | 69 | 0.21 | Anatase/Brookite |

Legend:
TiIP titanium tetra(isopropylate)
TiEtHex titanium tetra(2-ethylhexanolate)
TiBut titanium tetra(butanolate)
TiEtBut titanium tetra(2-ethylbutanolate)
TiHex titanium tetra(hexanolate)
TiButOct titanium tetra(2-butyloctanolate)
[1] multipoint BET ($N_2$) $[m^2/g]$ (calcination 3 h/550° C.)
[2] intrusion pore volume (Hg) [ml/g] for pore radii from 0-80 nm (calcination 3 h/550° C.)
[3] x-ray diffraction analysis of the main/side phases of uncalcined products Example 3

$TiO_2/SiO_2$

Co-Hydrolysis with Silicic Acid without Hydrothermal Aging

In a stirred reactor, for example 45 kg of titanium tetra (isopropylate) with a titanium content of 16.8 wt % were continuously hydrolysed at 25 to 70° C. with 135 kg of deionised water blended with a freshly prepared quantity of approx. 3% silica sol. The residence time was in the range from 30 to 60 minutes.

The resultant suspension then was subjected to azeotropic steam distillation in order to remove the alcohol released during hydrolysis and, thereafter, it was dried as usual in a spraydryer drier at an air-outlet temperature from 100 to 130° C. The carbon content in the resultant solids was less than 0.2%.

The different $TiO_2/SiO_2$ mass ratios for preparing catalyst carriers according to Example 3 have been compiled in Table 3. The physical data of the resultant catalyst carriers are included in Table 4.

TABLE 3

FEED QUANTITIES FOR THE SYNTHESES OF EXAMPLE 3

| Alcoholate (16.8 wt % Ti) [kg] | Water [kg] | Silicic Acid (3.0 wt %) [kg] | $TiO_2$ [wt %] | $SiO_2$ [wt %] | Total Quantity [kg] |
|---|---|---|---|---|---|
| 45 | 135 | 0 | 100 | 0 | 180 |
| 45 | 128.6 | 6.4 | 98.5 | 1.5 | 180 |
| 45 | 113 | 22 | 95 | 5 | 180 |
| 45 | 88.5 | 46.5 | 90 | 10 | 180 |
| 45 | 30 | 105 | 80 | 20 | 180 |
| 36 | 0 | 144 | 70 | 30 | 180 |
| 17.5 | 0 | 162.5 | 50 | 50 | 180 |
| 12 | 0 | 168 | 40 | 60 | 180 |
| 2.1 | 0 | 177.9 | 10 | 90 | 180 |
| 1 | 0 | 179 | 5 | 95 | 180 |
| 0 | 0 | 180 | 0 | 100 | 180 |

TABLE 4

PHYSICAL DATA OF THE $TiO_2/SiO_2$ CATALYST CARRIERS OF EXAMPLE 3 (INFLUENCE OF THE HYDROLYSIS TEMPERATURE IN THE CO-HYDROLYSIS)

| $TiO_2/SiO_2$ Ratio [wt %/%] | Hydrolysis Temperature [° C.] | Surface $[m^2/g]^{1)}$ | Pore Volume $[ml/g]^{2)}$ | Crystal Structure[3] |
|---|---|---|---|---|
| 98.6/1.4 | 25 | 143 | 0.25 | Anatase/Brookite |
| 94.0/6.0 | 25 | 177 | 0.31 | Anatase/Brookite |
| 86.6/13.4 | 25 | 168 | 0.19 | Anatase/Brookite |
| 72.8/27.2 | 25 | 222 | 0.19 | Anatase/Brookite/ Amorphous $SiO_2$ |
| 43.9/56.1 | 25 | 148 | 0.07 | Anatase/Brookite/ Amorphous $SiO_2$ |
| 100/0 | 70 | 83 | 0.28 | Anatase/Brookite |
| 98.5/1.0 | 70 | 115 | 0.33 | Anatase/Brookite |
| 94.3/5.7 | 70 | 182 | 0.38 | Anatase/Brookite |
| 89.0/11.0 | 70 | 232 | 0.46 | Anatase/Brookite |
| 78.4/21.6 | 70 | 249 | 0.36 | Anatase/Amorphous $SiO_2$ |
| 46.2/53.8 | 70 | 350 | 0.22 | Amorphous (Anatase/$SiO_2$) |
| 9.6/90.4 | 70 | 549 | 0.14 | Amorphous $SiO_2$ |
| 0/100 | 70 | 345 | 0.08 | Amorphous $SiO_2$ |

Legend:
[1] multipoint BET ($N_2$) $[m^2/g]$ (calcination 3 h/550° C.)
[2] total pore volume (Hg) [ml/g] for pore radii from 0–80 nm (calcination 3 h/550° C.)
[3] x-ray diffraction analysis of the main/side phases of uncalcined products Example 4

$TiO_2/SiO_2$

Silicic-Acid Slurry Doping and Aging

The experiment was carried out as described in Example 3, the difference being that titanium alcoholate was hydrolysed with an 0.2 wt % aqueous solution of ammonia during approx.

45 minutes. The aqueous titanium dioxide suspension separated from the alcohols then was blended with the required quantity of silicic acid, which had been deionised on cation-exchange resins and had a $SiO_2$ content of approx. 3 wt %. Thereafter, the resultant suspension was aged for 5 hours at 90° C. with stirring in a closed system, followed by spray drying as described in Example 3. The physical data of the catalyst carriers prepared in this way have been compiled in Table 5.

This slurry-doping process, too, allowed to readily adjust the $TiO_2/SiO_2$ ratio in the catalyst carrier by increasing the amount of the approx. 3 wt % silicic acid, while the alcoholate feed remained unchanged. The chemical impurities thresholds stated in Example 3 were met in these experiments.

Based on the findings of Example 3 revealing that a higher value is obtained at a higher hydrolysis temperature, the hydrolysis temperature was set at 70° C. in this process variant. In addition to the influence of a higher hydrolysis temperature, the aim of Example 4 was to also examine the physical data as a function of the residence time (aging for 5 hours at 90° C.).

Example 5

$TiO_2/SiO_2$

Co-Hydrolysis of Various Titanium Alcoholates with Silicic Acid

The syntheses were carried out as described in Example 3, the difference being that various titanium alcoholates were reacted with fresh silicic acid. The alcoholates used in these experiments included e.g. titanium tetra(2-ethylbutanolate) (TiEtBut with 8.5 wt % Ti), titanium tetra(hexanolate) (TiHex with 9.5 wt % Ti), and titanium tetra(2-ethylhexanolate) (TiEtHex with 8.5 wt % Ti). The quantities used for preparing catalyst carriers with different $TiO_2/SiO_2$ ratios have been compiled in Table 6. The physical data are listed in Table 7.

TABLE 5

PHYSICAL DATA OF THE $TiO_2/SiO_2$ CATALYST CARRIERS OF EXAMPLE 4
(INFLUENCE OF AGING (5 h/90° C.) ON SLURRY DOPING)

| $TiO_2/SiO_2$ Ratio [wt %/%] | Hydrolysis Conditions | | | Pore | | Crystal Structure[3] |
|---|---|---|---|---|---|---|
| | Temperature [° C.] | Additive [wt %] | Aging [hr/° C.] | Surface $[m^2/g]$[1] | Volume $[ml/g]$[2] | |
| 100/0 | 70 | $NH_3$ (0.2%) | 5 h/90 | 90 | 0.21 | Anatase/Brookite |
| 99.0/1.0 | 70 | $NH_3$ (0.2%) | 5 h/90 | 110 | 0.30 | Anatase/Brookite |
| 94.3/5.7 | 70 | $NH_3$ (0.2%) | 5 h/90 | 181 | 0.36 | Anatase/Brookite |
| 89.1/10.9 | 70 | $NH_3$ (0.2%) | 5 h/90 | 222 | 0.60 | Anatase/Brookite |
| 79.2/20.8 | 70 | $NH_3$ (0.2%) | 5 h/90 | 282 | 0.67 | Anatase/Brookite |
| 41.9/58.1 | 70 | $NH_3$ (0.2%) | 5 h/90 | 417 | 0.63 | Amorphous (Anatase/$SiO_2$) |

Legend:
[1] multipoint BET ($N_2$) $[m^2/g]$ (calcination 3 h/550° C.)
[2] intrusion pore volume (Hg) [ml/g] for pore radii from 0-80 nm (calcination 3 h/550° C.)
[3] x-ray diffraction analysis of the main/side phases of uncalcined products

TABLE 6

FEED QUANTITIES FOR THE SYNTHESES OF EXAMPLE 5

| Alcoholate | Water [kg] | Silicic Acid (3.0%) [kg] | $TiO_2$ [wt %] | $SiO_2$ [wt %] | Total Quantity [kg] |
|---|---|---|---|---|---|
| (9.5 wt % Ti) [kg] | | | | | |
| | 45 | 135 | 0 | 100 | 0 | 180 |
| | 45 | 132.5 | 2.5 | 99.0 | 1 | 180 |
| | 45 | 122.5 | 12.5 | 95.0 | 5 | 180 |
| | 45 | 110 | 25 | 90 | 10 | 180 |
| (8.5 wt % Ti) [kg] | | | | | |
| | 45 | 135 | 0 | 100 | 0 | 180 |
| | 45 | 132.9 | 2.1 | 99.0 | 1 | 180 |
| | 45 | 123.8 | 11.2 | 95.0 | 5 | 180 |
| | 45 | 111 | 24 | 90 | 10 | 180 |

Example 5 shows that according to the process of the invention, $TiO_2/SiO_2$ ratio in the catalyst carrier can be adjusted for different titanium alcoholates and various titanium concentrations (9.5 or 8.5 wt %) by varying the amount of silica sol added, while the total amount of reactants remains unchanged. The water quantity is overstoichiometric as in all these experiments.

Since the titanium alcoholates used herein were prepared by transesterification of the titanium tetra(isopropylate) employed in Example 3, the chemical impurities in the $TiO_2/SiO_2$ products of Example 5 are as low as in Example 3.

The x-ray diffraction analysis of the $TiO_2/SiO_2$ mixed oxides revealed that all catalyst carriers of Example 5 comprise anatase but no rutile.

TABLE 7

PHYSICAL DATA OF THE TiO$_2$/SiO$_2$ MIXED-OXIDE
CATALYST CARRIERS OF EXAMPLE 5
(USE OF DIFFERENT TITANIUM ALCOHOLATES IN THE
CO-HYDROLYSIS WITH FRESH SILICIC ACID)

| TiO$_2$/SiO$_2$ Ratio [wt %/%] | Alcoholate | Hydrolysis Conditions Temperature [° C.] | Additive | Surface [m$^2$/g][1] | Pore Volume [ml/g][2] | Crystal Structure[3] |
|---|---|---|---|---|---|---|
| 99.0/1.0 | TiEtBut | 70 | water | 119 | 0.21 | Anatase/Brookite |
| 94.7/5.3 | TiEtBut | 70 | water | 192 | 0.28 | Anatase/Brookite |
| 89.5/10.5 | TiEtBut | 70 | water | 244 | 0.28 | Anatase/Brookite |
| 94.7/5.3 | TiHex | 70 | water | 202 | 0.36 | Anatase/Brookite |
| 89.7/10.3 | TiHex | 70 | water | 238 | 0.37 | Anatase/Brookite |
| 98.9/1.1 | TiEtHex | 70 | water | 122 | 0.21 | Anatase/Brookite |
| 94.6/5.4 | TiEtHex | 70 | water | 201 | 0.28 | Anatase/Brookite |
| 89.3/10.7 | TiEtHex | 70 | water | 247 | 0.28 | Anatase/Brookite |
| 90.2/9.8 | TiEtHex | 90 | water | 250 | 0.32 | Anatase/Brookite |

Legend:
[1] multipoint BET (N$_2$) [m$^2$/g] (calcination 3 h/550° C.)
[2] intrusion pore volume (Hg) [ml/g] for pore radii from 0-80 nm (calcination 3 h/550° C.)
[3] x-ray diffraction analysis of the main/side phases of uncalcined products Example 6

TiO$_2$/SiO$_2$

Influence of Aging on Co-Hydrolysis and Slurry-Doping Method

Suspensions doped with an increasing amount of silicic acid were prepared as described in the Examples 3 and 4. After separation of the alcohols, these suspensions were subjected to aging for at least 4 hours at temperatures of 90 and 210° C., followed by drying as described in Example 3. The physical data have been compiled in Table 8.

TABLE 8

PHYSICAL DATA OF THE TiO$_2$/SiO$_2$ MIXED-OXIDE
CATALYST CARRIERS OF EXAMPLE 6
(INFLUENCE OF TEMPERATURE (90° C. AND 210° C.) AND DURATION
OF AGING ON CO-HYDROLYSIS AND SLURRY DOPING METHOD)

| TiO$_2$/SiO$_2$ Ratio [wt %/%] | Alcoholate | Hydrolysis Conditions T [° C.]/Additive/pH[4] | Aging [hr/° C.] | Surface [m$^2$/g][1] | Pore Volume [ml/g][2] | Pore Radius [nm][3] | Crystal Strucutre[5] |
|---|---|---|---|---|---|---|---|
| a) Co-Hydrolysis | | | | | | | |
| 94.3/5.7 | TiIP | 70/silica sol/3.8 | 5 h/90 | 194 | 0.35 | 5.5 | Anatase/Brookite |
| 89.0/11.0 | TiIP | 70/silica sol/3.6 | 5 h/90 | 247 | 0.52 | 4.9 | Anatase/Brookite |
| 82.2/17.8 | TiIP | 70/silica sol/3.3 | 5 h/90 | 294 | 0.44 | 4.7 | Anatase/Brookite |
| 9.6/90.4 | TiIP | 70/silica sol/2.9 | 5 h/90 | 724 | 0.11 | 2.8 | Amorphous (SiO$_2$) |
| 94.6/5.4 | TiIP | 70/silica sol/3.8 | 4 h/210 | 180 | 0.51 | 7.4 | Anatase/Brookite |
| 89.0/11.0 | TiIP | 70/silica sol/3.6 | 4 h/210 | 182 | 0.94 | 11.4 | Anatase/Brookite |
| 79.3/20.7 | TiIP | 70/silica sol/3.3 | 4 h/210 | 205 | 1.14 | 11.4 | Anatase/Brookite |
| 9.6/90.4 | TiIP | 70/silica sol/2.9 | 5 h/210 | 326 | 1.18 | 4.7 | Amorphous (SiO$_2$) |
| b) Slurry Doping | | | | | | | |
| 89.3/10.7 | TiHex | 30/NH$_4$HCO$_3$ (2%)/6.7 | 5 h/90 | 205 | 0.20 | 3.2 | Amorphous (Anatase) |
| 89.4/10.6 | TiHex | 30/NH$_4$HCO$_3$(2%)/6.7 | 5 h/210 | 150 | 0.52 | 5.6 | Anatase |
| 95.5/4.5 | TiIP | 70/NH$_3$ (0.2%)/8.5 | 5 h/90 | 179 | 0.39 | 6.3 | Anatase/Brookite |
| 89.1/10.9 | TiIP | 70/NH$_3$ (0.2%)/8.5 | 5 h/90 | 222 | 0.60 | 8.2 | Anatase/Brookite |
| 79.2/20.8 | TiIP | 70/NH$_3$ (0.2%)/8.5 | 5 h/90 | 282 | 0.67 | 8.1 | Amorphous (Anatase) |
| 95.5/4.5 | TiIP | 70/NH$_3$ (0.2%)/8.5 | 4 h/210 | 112 | 0.38 | 7.5 | Anatase/Brookite |
| 89.4/10.6 | TiIP | 70/NH$_3$ (0.2%)/8.5 | 4 h/210 | 167 | 0.49 | 5.5 | Anatase/Brookite |
| 82.4/17.6 | TiIP | 70/NH$_3$ (0.2%)/8.5 | 4 h/210 | 156 | 0.93 | 14.8 | Anatase/Brookite |
| 89.9/10.1 | TiIP | 70/HNO$_3$ (0.2%)/2.1 | 5 h/90 | 213 | 0.26 | 3.7 | Anatase/Brookite |
| 90.2/9.8 | TiIP | 70/Leucine (1.0%) and NH$_3$ (0.2%)/6.0 | 5 h/90 | 218 | 0.44 | 4.2 | Anatase/Brookite |

TABLE 8-continued

PHYSICAL DATA OF THE TiO$_2$/SiO$_2$ MIXED-OXIDE
CATALYST CARRIERS OF EXAMPLE 6
(INFLUENCE OF TEMPERATURE (90° C. AND 210° C.) AND DURATION
OF AGING ON CO-HYDROLYSIS AND SLURRY DOPING METHOD)

| TiO$_2$/SiO$_2$ Ratio [wt %/%] | Alcoholate | Hydrolysis Conditions T [° C.]/Additive/pH[4] | Aging [hr/° C.] | Pore Surface [m$^2$/g][1] | Pore Volume [ml/g][2] | Radius [nm][3] | Crystal Strucutre[5] |
|---|---|---|---|---|---|---|---|
| 89.3/10.7 | TiIP | 70/HNO$_3$ (0.2%)/2.1 | 5 h/210 | 180 | 0.56 | 7.2 | Anatase/Brookite |
| 90.8/9.2 | TiIP | 70/Leucine (1.0%) and NH$_3$ (0.2%)/6.0 | 4 h/210 | 189 | 0.55 | 6.6 | Anatase/Brookite |

Legend:
[1] multipoint BET (N$_2$) [m$^2$/g] (calcination 3 h/550° C.)
[2] intrusion pore volume (Hg) [ml/g] for pore radii from 0-80 nm (calcination 3 h/550° C.)
[3] average pore radius calculated from intrusion volume (2V/A) for pore radii from 0-80 nm
[4] pH values after hydrolysis
[5] x-ray diffraction analysis of the main/side phases of uncalcined products Example 7

TiO$_2$/SiO$_2$

Variation of the Stirrer Circumferential Velocity

Suspensions were prepared utilising the co-hydrolysis method as described in Example 5. The alcoholate used was titanium tetra(2-ethylhexanolate). These suspensions then were subjected to aging at 210° C. as described in Example 6. The stirrer circumferential velocity was varied during the aging procedure. The resultant suspensions were spray-dried as described in Example 3. The physical data of the catalyst carriers have been compiled in Table 9.

TABLE 9

PHYSICAL DATA OF THE TiO$_2$/SiO$_2$ CATALYST
CARRIERS OF EXAMPLE 7
(INFLUENCE OF THE STIRRER CIRCUMFERENTIAL VELOCITY
[m/s]* DURING THE AGING OF SUSPENSIONS PREPARED
BY CO-HYDROLYSIS)

| TiO$_2$/SiO$_2$ Ratio [wt %/%] | Alcoholate | Stirrer Circumferential Velocity [m/s]* | Surface [m$^2$/g][1] | Pore Volume [ml/g][2] | Crystal Structure[3] |
|---|---|---|---|---|---|
| 100/0 | TiEtHex | 0 | 82 | 0.30 | Anatase/Brookite |
| 100/0 | TiEtHex | 1.04 | 80 | 0.34 | Anatase/Brookite |
| 100/0 | TiEtHex | 2.61 | 81 | 0.44 | Anatase/Brookite |
| 90.2/9.8 | TiEtHex | 0 | 211 | 0.55 | Anatase/Brookite |
| 90.2/9.8 | TiEtHex | 1.04 | 210 | 0.56 | Anatase/Brookite |
| 90.2/9.8 | TiEtHex | 2.61 | 205 | 0.68 | Anatase/Brookite |

Legend:
*stirrer circumferential velocity: V (m/s) = D$_R$ (m) · 3.14 · N · 1/60 (1/s);
where: D$_R$ = stirrer diameter, N = rpm
Hydrolysis Conditions T = 90° C./Additive = NH$_3$ (0.2%)
TiEtHex = titanium tetra(2-ethylhexanolate)
[1] multipoint BET (N$_2$) [m$^2$/g] (calcination 3 h/550° C.)
[2] intrusion pore volume (Hg) [ml/g] for pore radii from 0-80 nm (calcination 3 h/550° C.)
[3] x-ray diffraction analysis of the main/side phases of uncalcined products Example 8

TiO$_2$/SiO$_2$

Silicic Acid Ester (TEOS) without and with Aging

The silicic acid ester tetraethoxysilane (TEOS) (27.2 wt % SiO$_2$) was hydrolysed as described below in a batch reaction with addition of a 1.0 wt % nitric acid. TEOS was placed into a stirred reactor and heated to boiling point at which point the ester was hydrolysed by addition of aqueous nitric acid with reflux cooling. The reaction was complete once the initially turbid solution turned clear.

TABLE 10

FEED QUANTITIES FOR THE SYNTHESES OF EXAMPLE 8

| TEOS with 27.2 wt % SiO$_2$ [kg] | HNO$_3$ (1 wt %) [kg] | Alcoholate (16.8 wt % Ti) [kg] | Water [kg] | TiO$_2$ [wt %] | SiO$_2$ [wt %] | Total Quantity [kg] |
|---|---|---|---|---|---|---|
| 0.7 | 0.14 | 44.6 | 133.9 | 98.5 | 1.5 | 179.3 |
| 2.4 | 0.48 | 44.3 | 132.8 | 95 | 5 | 180.0 |
| 5.0 | 1.0 | 43.7 | 131.0 | 90 | 10 | 180.7 |

The titanium tetra(isopropylate) then was hydrolysed in a stirred reactor at 70° C. by simultaneous addition of completely hydrolysed, clear, aqueous TEOS solution and alcoholate. The hydrolysis took 45 minutes. The resultant suspension was treated as described in Example 3. The ethanol/isopropanol mixture was removed by azeotropic steam distillation. The spray drier had the usual air-outlet temperature of 100 to 130° C.

TABLE 11

PHYSICAL DATA OF THE $TiO_2/SiO_2$ MIXED-OXIDE CATALYST CARRIERS OF EXAMPLE 8
(CO-HYDROLYSIS performed with nitric acid and TEOS at 70° C.)

| $TiO_2/SiO_2$ [wt %/%] | Alcoholate | Surface $[m^2/g]^{1)}$ | Pore Volume $[ml/g]^{2)}$ | Crystal Structure[3] |
|---|---|---|---|---|
| a) TEOS without Thermal Aging |||||
| 100/0*[)] | TiIP | 52 | 0.14 | Anatase/Brookite |
| 98.75/1.25 | TiIP | 141 | 0.29 | Anatase/Brookite |
| 94.7/5.3 | TiIP | 199 | 0.37 | Anatase/Brookite |
| 89.4/10.6 | TiIP | 218 | 0.45 | Anatase/Brookite |

TABLE 11-continued

PHYSICAL DATA OF THE $TiO_2/SiO_2$ MIXED-OXIDE CATALYST CARRIERS OF EXAMPLE 8
(CO-HYDROLYSIS performed with nitric acid and TEOS at 70° C.)

| $TiO_2/SiO_2$ [wt %/%] | Alcoholate | Surface $[m^2/g]^{1)}$ | Pore Volume $[ml/g]^{2)}$ | Crystal Structure[3] |
|---|---|---|---|---|
| b) TEOS with Thermal Aging (5 h/210° C.)[#] |||||
| 100/0*[)] | TiIP | 72 | 0.22 | Anatase/Brookite |
| 89.5/10.5 | TiIP | 168 | 0.61 | Anatase |

Legend:
*[)]reference sample (hydrolysed in 0.2 wt % $HNO_3$)
[)]stirrer speed: 400 rpm
TEOS tetraethoxysilane
TiIP titanium tetra(isopropylate)
[1)]multipoint BET ($N_2$) [$m^2/g$] (calcination 3 h/550° C.)
[2)]intrusion pore volume (Hg) [ml/g] for pore radii from 0-80 nm (calcination 3 h/550° C.)
[3)]x-ray diffraction analysis of the main/side phases of uncalcined products This experiment was carried out in two variants: without aging of the alcohol-free suspension and with aging for 5 h at 210° C. The mass ratios used for making catalyst carriers with different $TiO_2/SiO_2$ ratios as described in Example 8 have been listed in Table 10. The physical data have been compiled in Table 11, which also includes for comparison the physical data of the catalyst carriers obtained by aqueous nitric hydrolysis of titanium tetra(isopropylate) at 70° C. (cf. Tables 1 and 2).

Example 9

$TiO_2/SiO_2$

Slurry Doping with Levasil

Example 4 was repeated, the difference being that a commercially available silicic acid prepared by cation exchange (LEVASIL 500 from H.C. Starck company, Goslar) was used. This silicic acid had a particle size of 9.3 nm according to Sears, a solids content of 15%, and a pH of 9.3. The experiment was carried out in two variants: with aging of the alcohol-free suspension for 5 h at 90° C. and for 5 h at 210° C. The physical data of the resultant catalyst carriers have been compiled in Table 12.

TABLE 12

PHYSICAL DATA OF THE $TiO_2/SiO_2$ CATALYST CARRIERS OF EXAMPLE 9
(SLURRY FROM HYDROLYSIS OF TiIP IN $NH_3$ (0.2%) DOPED WITH LEVASIL AT 70° C.; WITH THERMAL AGING)

| $TiO_2/SiO_2$ Ratio [wt %/%] | Alcoholate | Hydrolysis Conditions T [° C.]/Additive | Aging [hr/° C.] | Surface $[m^2/g]^{1)}$ | Pore Volume $[ml/g]^{2)}$ | Crystal Structure[3] |
|---|---|---|---|---|---|---|
| 88.3/11.7 | TiIP | 70/$NH_3$ (0.2%) | 5 h/90 | 196 | 0.26 | Anatase/Brookite |
| 88.3/11.7 | TiIP | 70/$NH_3$ (0.2%) | 5 h/210 | 162 | 0.65 | Anatase/Brookite |

Legend:
TiIP titanium tetra(isopropylate)
[1)]multipoint BET ($N_2$) [$m^2/g$] (calcination 3 h/550° C.)
[2)]intrusion pore volume (Hg) [ml/g] for pore radii from 0-80 nm (calcination 3 h/550° C.)
[3)]x-ray diffraction analysis of the main/side phases of uncalcined products

Example 10

$TiO_2/SiO_2$

Thermostability Examinations of the Catalyst Carriers

Various catalyst carriers were selected from among the group prepared in Example 4 (cf. Table 5) and were calcined for 3 h at 550° C. in a lab-scale muffle furnace. Moreover, the products then were exposed for several hours to 800 and 1,100° C. The physical data have been compiled in Table 13.

TABLE 13

THERMOSTABILITY EXAMINATION ACCORDING TO EXAMPLE 10 OF THE $TiO_2/SiO_2$ MIXED-OXIDE CATALYST CARRIERS OF EXAMPLE 4

| $TiO_2/SiO_2$ [wt %/%] | Calcination [hr/° C.] | Surface[1)] $[m^2/g]$ | Pore Volume[2)] [ml/g] |
|---|---|---|---|
| 94.3/5.7 | 3 h/550 | 181 | 0.39 |
|  | 3 h/800 | 117 | 0.31 |
|  | 24 h/1,100 | 0.6 | 0.01 |
| 89.1/10.9 | 3 h/550 | 222 | 0.59 |
|  | 3 h/800 | 151 | 0.43 |
|  | 24 h/1,100 | 4.0 | 0.02 |
| 79.2/20.8 | 3 h/550 | 282 | 0.53 |
|  | 3 h/800 | 200 | 0.49 |

TABLE 13-continued

THERMOSTABILITY EXAMINATION ACCORDING TO
EXAMPLE 10 OF THE TiO$_2$/SiO$_2$ MIXED-OXIDE CATALYST
CARRIERS OF EXAMPLE 4

| TiO$_2$/SiO$_2$ [wt %/%] | Calcination [hr/° C.] | Surface[1] [m$^2$/g] | Pore Volume[2] [ml/g] |
|---|---|---|---|
|  | 24 h/1,100 | 168 | 0.42 |
| 41.9/58.1 | 3 h/550 | 417 | 0.65 |
|  | 3 h/800 | 361 | 0.62 |
|  | 24 h/1,100 | 239 | 0.63 |

Legend:
[1] multipoint BET (N$_2$) [m$^2$/g]
[2] intrusion pore volume (Hg) [ml/g] for pore radii from 0–80 nm Example 11

TiO$_2$/SiO$_2$

Influence of the SiO$_2$ Content on the Rutile Formation

Various TiO$_2$ and TiO$_2$/SiO$_2$ mixed-oxide catalyst carriers prepared according to the Examples 1 to 9 were selected after spray drying for a thermogravimetric analysis in order to examine the influence of different process variants, the SiO$_2$ content, and the SiO$_2$ source on the rutile formation temperature.

The peak temperatures of the rutile formation according to DTA/DTG are shown in Table 14. The rutile formation at the temperatures stated below has been proved by x-ray powder diffraction.

TABLE 14

PHYSICAL DATA OF THE TiO$_2$/SiO$_2$ CATALYST CARRIERS OF
EXAMPLES 1, 3 AND 6
INFLUENCE OF SiO$_2$ CONTENT AND AGING ON THE
ANATASE/RUTILE PHASE CHANGE MEASURED BY X-RAY
DIFFRACTION

| TiO$_2$/SiO$_2$ Ratio [wt %/%] | Rutile Formation Temperature [° C.] | Mixed-Oxide Synthesis Conditions |
|---|---|---|
| 100/0 | 680 | TiIP hydrolysis at 70° C.; with NH$_3$ (0.2 wt %); aging: 5 h/90° C. |
| 100/0 | 760 | TiIP hydrolysis at 70° C.; with NH$_3$ (0.2 wt %); aging: 4 h/210° C. |
| 89.0/11.0 | 1080 | TiIP/silicic acid co-hydrolysis at 70° C.; aging: 5 h/90° C. |
| 89.0/11.0 | 1140 | TiIP/silicic acid co-hydrolysis at 70° C.; aging: 4 h/210° C. |
| 82.2/17.8 | 1150 | TiIP/silicic acid co-hydrolysis at 70° C.; aging: 5 h/90° C. |
| 79.3/20.7 | 1160 | TiIP/silicic acid co-hydrolysis at 70° C.; aging: 4 h/210° C. |
| 46.2/53.8 | 1180 | TiIP/silicic acid co-hydrolysis at 70° C.; without aging |
| 9.6/90.4 | 1160 | TiIP/silicic acid co-hydrolysis at 70° C.; without aging |
| 89.3/10.7 | 1080 | Hydrolysis of TiHex in NH$_4$HCO$_3$(2 wt %) at 30° C.; aging: 5 h/90° C. |
| 89.4/10.6 | 1250 | Hydrolysis of TiHex at 30° C. in NH$_4$HCO$_3$ (2 wt %); aging: 4 h/210° C. |

What is claimed is:

1. A process for the manufacture of TiO$_2$/SiO$_2$ mixed oxides or the hydrates and/or oxide hydrates thereof comprising 0.5 to 95 wt % Si, referring to the total Ti and Si and calculated as SiO$_2$ and TiO$_2$, respectively, comprising:

contacting a titanium compound or the hydrolysis product thereof with a silicic acid compound in an aqueous medium, wherein the titanium compound comprises a titanium alcoholate having at least one $C_1$- to $C_{16}$ alcoholate group, the silicic acid compound comprises an aqueous silicic acid sol, the silicic acid compound in aqueous solution has an average particle size of 1.8 to 3.0 nm, and the silica acid sol has a viscosity of less than 10 mPas at 25° C.; and hydrolyzing the titanium compound.

2. The process according to claim 1, characterised in that the process further includes drying the resultant product and/or calcination at above 350° C., for at least 30 minutes.

3. A process according to any one of claims 1 or 2, characterised in that the titanium compound is hydrolysed at 25 to 100° C.

4. A process according to any one of claims 1 or 2, characterised in that the silica acid sol comprises 1.0 to 8.0 wt % silicic acid, calculated as SiO$_2$.

5. A process according to any one of claims 1 or 2, characterised in that the process comprises the removal of excess alcohol by azeotropic steam distillation, wherein the removal takes place after hydrolysis of the titanium compound and preferably after addition of the silicic acid compound.

6. A process according to any one of claims 1 or 2, characterised in that before, during or after addition of the silicic acid compound, hydrothermal aging is carried out at temperatures from 90 to 235° C., for at least 1 hour, at the pressure established at these temperatures in a closed vessel.

7. A process according to any one of claims 1 or 2, characterised in that hydrolysis and/or hydrothermal aging is (are) carried out in the presence of additives selected from the group consisting of ammonia, ammonium bicarbonate, amino acids, mono-, di- and tri-carboxylic acids and mixtures thereof.

8. The process according to claim 7, characterised in that the additives are employed in quantities from 0.1 to 8.0 wt %.

9. A process according to any one of claims 1 or 2, characterised in that hydrolysis and/or hydrothermal aging is (are) performed at a pH value of the resultant aqueous slurries of less than 10.0.

10. A process according to any one of claims 1 or 2, comprising spray drying the resultant mixed-oxide product.

11. A process according to any one of claims 1 or 2, characterised in that the TiO$_2$/SiO$_2$ mixed oxide or the hydrates and/or oxide hydrates thereof contain more than 5 and less than 40 wt % Si, based on the total Ti and Si as SiO$_2$ and TiO$_2$, respectively.

12. A process according to any one of claims 1 or 2, characterised in that the titanium compound is hydrolysed in the presence of the silicic acid compound.

13. A process according to any one of claims 1 or 2, characterised in that at first the titanium compound is hydrolysed, the alcohol compounds are optionally removed, and the silicic acid compound is added thereafter.

14. A process according to any one of claims 1 or 2, characterised in that the silicic acid compound is prepared using cation-exchange resins.

15. A process according to any one of claim 1 or 2, characterised in that during hydrolysis and/or hydrothermal aging the mixing energy input corresponds to a stirrer circumferential velocity of 1 to 6 m/s.

16. A process according to any one of claims 1 or 2, characterised in that at least 90 wt % of the titanium compound is hydrolysable and irrespective of the latter at least 60 wt % is a titanium alcoholate.

17. A process according to any one of claims 1 or 2, characterised in that the silicic acid compound comprises a maximum of 300 ppm of silicic acid salt and a maximum of 200 ppm metal.

\* \* \* \* \*